F. W. RAGUSE.
GROOVING AND CUTTING MACHINE.
APPLICATION FILED AUG. 1, 1910.
1,036,905.
Patented Aug. 27, 1912.
2 SHEETS—SHEET 2.
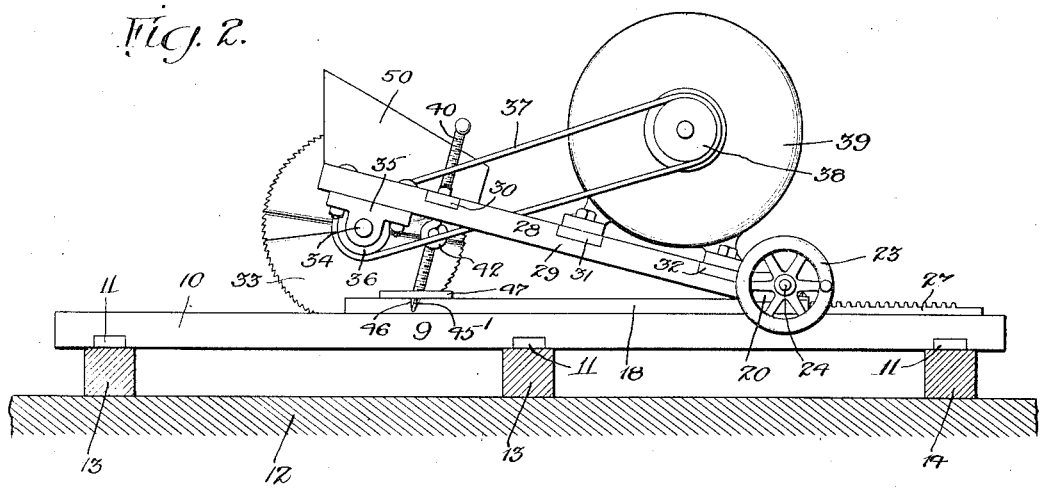
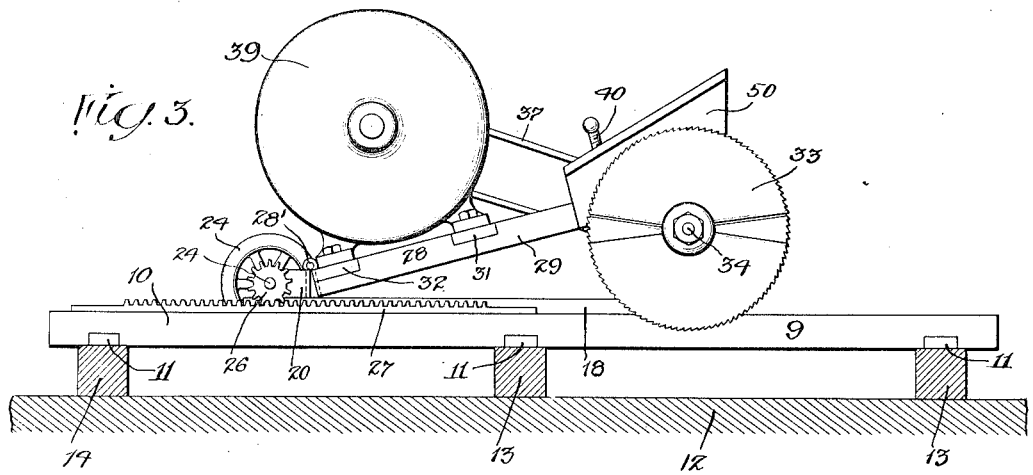
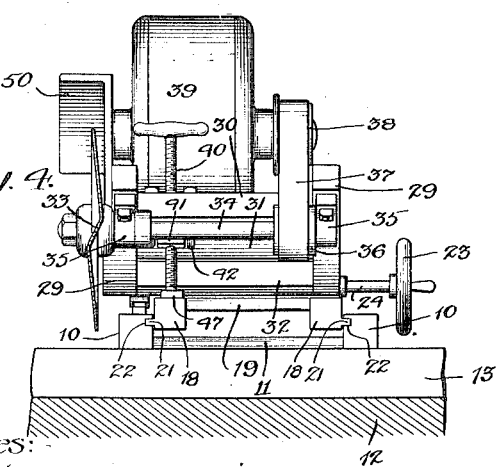
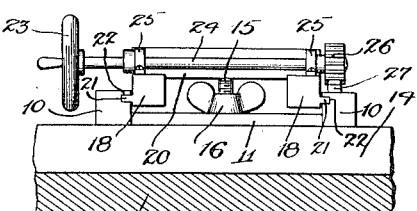

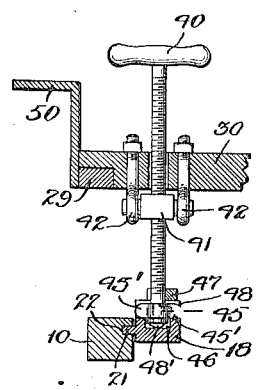

UNITED STATES PATENT OFFICE.

FRED W. RAGUSE, OF CHICAGO, ILLINOIS.

GROOVING AND CUTTING MACHINE.

1,036,905.  Specification of Letters Patent.  Patented Aug. 27, 1912.

Application filed August 1, 1910. Serial No. 574,752.

*To all whom it may concern:*

Be it known that I, FRED W. RAGUSE, a resident of Chicago, in the county of Cook and State of Illinois, have invented certain new and useful Improvements in Grooving and Cutting Machines, of which the following is a full, clear, and exact description.

The invention relates to grooving and cutting machines and designs to provide an improved machine which can be easily transported so that it may be used in or around buildings in the course of construction or in shops.

The invention further designs to provide an improved grooving or cutting machine in which a saw may be used for cutting grooves in lieu of a routing-tool. In the use of the latter, in cutting side boards for stairs, the routing tool causes the wood to be turned or split near the edges of the board and by providing a cutting tool, such as a saw, capable of manipulation to cut grooves at different angles, this objection is overcome, the saw being mounted so it may be moved in different paths to facilitate the work.

The invention further designs to provide an improved grooving and cutting machine.

The invention consists in the several novel features hereinafter set forth and more particularly defined by claim at the conclusion hereof.

In the drawings: Figure 1 is a plan of a machine embodying the invention. Fig. 2 is a side elevation. Fig. 3 is a similar view of the opposite side of the machine. Figs. 4 and 5 are end elevations. Fig. 6 is a detail of the adjusting-screw for the vertically swinging saw-carrier.
The improved machine comprises a frame 9, consisting of rails 10 and cross-rails 11 which are rigidly secured together to serve as a guide or track for a saw-carriage which is longitudinally movable thereon. This frame is adapted to be placed upon an ordinary work-table or bench 12, which is provided with guides 13 13' for the work to be cut or grooved, the frame 9 resting on these guides, which also serve to provide a space between the said frame and the top of the table 12 along which a board may be fed or manipulated. A spacing strip 14 is also placed upon the table 12 in position beneath one end of frame 9, and a bolt 15 pivotally connects one end of said frame to the table, being provided with a thumb-nut 16, whereby the frame may be clamped in assigned position. This bolt 15 permits the frame 9, with the saw-carriage thereon, to be adjusted angularly relatively to the work, so that the saw may be moved across the work in different or opposite angles, for example, as is necessary in cutting grooves in a stepside 17, as indicated in Fig. 1 of the drawings. Being pivotally held, the frame may be quickly swung to any desired angle corresponding to the angle of the grooves to be cut in the board. The guides 13, 13' are spaced far enough apart to leave room for the saw to cut the step-side 17 to one edge thereof, and said guide 13' also affords a support for the frame 9 upon which it may be swung to the extreme limit of movement in either direction.

A saw-carriage is slidably sustained by the pivotally adjustable frame 9 and comprises a pair of side-rails 18 which are cross connected by bars 19 and 20 and have tongues 21 adapted to slide in grooves 22 formed in the inner sides of side-bars 10 of frame 9. This carriage may be shifted longitudinally of the frame 9, by a handwheel 23, which is secured to a shaft 24 mounted in bearings 25 on the carriage and has a pinion 26 secured to one end thereof, the pinion engaging a rack 27 secured to the top face of one of the side-rails 10 of the frame 9. By rotation of the hand-wheel 23, the saw-carriage may be shifted longitudinally with respect to the frame 9, to cause the saw carried thereby to operate across the board 17 at the angle in which the frame 9 may be set.

The saw-carriage comprises a vertically swinging saw-carrier or frame 28 comprising side-rails 29 and cross-bars 30, 31 and 32 and is hinged at one end, as at 28', to the longitudinally movable frame 18 and carries a saw 33 at its other end, this pivotal connection permitting the frame to be lowered, to correspondingly shift the saw into the work, or to regulate the depth of the cut or to withdraw the saw from the work. Saw 33 is of suitable form to cut a groove, being of the form generally known as a "dado saw" being offset laterally for this purpose, and is secured to a shaft 34 which is mounted in bearings 35 secured to siderails 29 of frame 28. Said shaft is provided with a pulley 36 which is connected by a belt 37 with a pulley 38 of an electric motor 39, which is mounted on the frame 28 so that the driving relation will be maintained between the motor and the saw, without interfering with the vertical adjustment of the frame 28 and the saw.

A screw 40 is provided, for adjusting the pivotally movable frame 28 of the saw-carriage, and extends through a screw-collar 41 which has trunnions pivotally held in eyes 42 secured to the cross-bar 30 of said frame. The lower end of the screw is pivotally held in a collar 45 which is confined against vertical movement in a socket 46 formed in one of the side-rails 18 of the saw-carriage and by a plate 47 secured to frame 18 and overlying collar 45. The reduced lower end of screw 40 is pivotally held against vertical movement in collar 45 by a shoulder 48 and a head 48' on the lower end of the screw, so that the screw may be turned relatively to collar 45, to raise and lower the collar 41, which is connected to the vertical swinging frame of the saw-carriage. Collar 45 is provided with laterally extending wings or trunnions 45' which permit the screw to swing and accommodate itself to the raising and lowering movement of the frame.

A guard or hood 50 is secured on frame 28 to protect the operator from accidental contact with the rotating saw 33.

In operation, the board or work to be cut or grooved will be laid between guides 13 on the table 12 and frame 9 will be adjusted or set into position in such angular relation thereto, as to cause the saw to cut or groove the board at the desired angle. By adjusting the frame 9 about its pivot, the angle of the cut may be varied as desired. For example, in grooving step-sides in which the grooves extend at right angles to one another, the frame may be swung, first, at such angle as to cause one of the grooves to be cut by the saw, and then swung so that the saw will travel across the board at right angles to the last cut, the work being moved to bring it into proper position for the cut. When the frame 9 has been set into the desired angular position for a cut, the operator, by turning hand-wheel 23 will shift the saw-carriage, including the pivotally adjustable frame 28, together with the saw and motor, longitudinally, causing the saw to cut a groove in the work. By turning screw 40, frame 28 may be raised or lowered to correspondingly shift the saw 33 to bring the saw into the work and to vary the depth of the cut, as well as to withdraw the saw vertically from the work at the end of a cut if desired. In grooving step-sides it is customary to provide tapered grooves a, a' for the treads and risers and for wedges for securing them in the step-sides. When such a groove is to be cut, the frame 9 may reset after a straight cut has been made so that the groove may be widened by an additonal cut which will cut one side of the groove at a slight angle to the other side. When desired, a flat disk-saw may be substituted for the saw shown, so that boards may be cut off by the saw.

The invention thus provides a simple machine, which may be conveniently moved about and which is angularly adjustable to cut or groove the work at different angles, in which the saw is longitudinally movable to make the cut and in which the depth of the cut may be regulated by a screw and in which the motor is mounted on the saw-carriage so that the saw may be manipulated as desired, while a constant driving connection is maintained.

The invention is not be understood as restricted to the details shown and described, since these may be modified within the scope of the appended claims without departing from the spirit and scope of the invention.

Having thus described the invention, what I claim as new and desire to secure by Letters Patent, is:

1. In a cutting and grooving machine, a work-table, parallel guides thereon between which the work is positioned, a spacing strip upon one side of said guides, a frame pivotally connected to said spacing strip for adjustment angularly in a horizontal plane and supported in any adjusted position upon one of said guides, a carriage slidably sustained by said frame, and a cutter mounted on said carriage and vertically adjustable with respect thereto.

2. In a cutting and grooving machine, a work-table, parallel guides thereon between which the work is positioned, a spacing strip upon one side of said guides, a frame pivotally connected to said spacing strip for adjustment angularly in a horizontal plane and supported in any adjusted position upon one of said guides, a carriage slidably sustained by said frame, a cutter carrier pivoted to said carriage and free to swing below the level thereof between said guides, and a cutter on said carrier.

FRED W. RAGUSE.

Witnesses:
FRED GERLACH,
HILDEN C. PETERSEN.